United States Patent
Patel

(10) Patent No.: US 7,363,412 B1
(45) Date of Patent: Apr. 22, 2008

(54) INTERRUPTING A MICROPROCESSOR AFTER A DATA TRANSMISSION IS COMPLETE

(75) Inventor: Anand Ratibhai Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 296 days.

(21) Appl. No.: 10/791,350

(22) Filed: Mar. 1, 2004

(51) Int. Cl.
*G06F 13/24* (2006.01)

(52) U.S. Cl. ............ 710/262; 710/267; 710/310; 710/311; 710/57

(58) Field of Classification Search ........ 710/305–317, 710/31–36, 260–269, 48–57, 112–119
See application file for complete search history.

(56) References Cited

U.S. PATENT DOCUMENTS

| | | | |
|---|---|---|---|
| 6,243,787 B1 * | 6/2001 | Kagan et al. ............ 710/263 |
| 6,535,942 B1 * | 3/2003 | Karlsson et al. ............ 710/260 |
| 6,629,179 B1 * | 9/2003 | Bashford .................... 710/260 |
| 6,631,434 B1 * | 10/2003 | Johnson et al. ............ 710/260 |
| 6,633,941 B2 * | 10/2003 | Dunlap et al. ............. 710/262 |
| 6,718,413 B1 * | 4/2004 | Wilson et al. ............. 710/260 |
| 6,766,386 B2 * | 7/2004 | Dobson et al. ............... 710/39 |
| 6,941,408 B2 * | 9/2005 | Solomon .................... 710/310 |
| 6,963,946 B1 * | 11/2005 | Dwork et al. ............... 710/310 |
| 2003/0065856 A1 * | 4/2003 | Kagan et al. ............... 710/263 |

\* cited by examiner

*Primary Examiner*—Raymond N Phan
(74) *Attorney, Agent, or Firm*—Marger Johnson & McCollom, P.C.

(57) ABSTRACT

A network device includes a first port to allow the device to communicate with other devices on an expansion bus. The device also includes a second port to allow the device to communicate with devices on a second bus and a memory to store data. A processor receives an interrupt signal from an expansion device on the expansion bus and generates an indicator of completion. The processor then inserts the indicator into a transaction queue after the set of data.

17 Claims, 2 Drawing Sheets

INTERRUPTING A MICROPROCESSOR AFTER A DATA TRANSMISSION IS COMPLETE

BACKGROUND

In many systems, expansion devices along expansion busses that allow communication with the system processor add capabilities and functions. A common example of these expansion devices is circuits on expansion boards, or cards, that can be inserted into a backplane of a computing system. The expansion bus provides communication between the new card and the system processor. A common example of a bus protocol used in this situation is a Peripheral Component Interconnect (PCI) bus.

The PCI bus is linked to the system bus upon which resides the system memory, the system processor and other system components by a device referred to here as a PCI bridge. In the case of more than one expansion bus, bridges may exist between the expansion busses that are generally referred to as PCI-to-PCI bridges, or P2P bridges. As used here, the term bridge may be used to refer to either type of bridge. Multiple P2P bridges may exist between the expansion card and the system bus.

In most PCI implementations, the PCI card desires to transmit data to the system memory. The PCI card transmits the data desired to the system memory through a bridge. When the PCI card has completed its transmission of the data, it transmits an interrupt along a command path to the processor. The command path is generally much faster than the path taken by the data, referred to here as the data path.

For example, if the data transfer from the card is complete, the data may have been transferred to the bridge between the PCI device and the system memory. The bridge may be handling transactions for several different PCI devices and the data may be temporarily stored in a buffer until it can be transmitted to the system memory. This is just one example of latencies in the data path. The result is that the processor receives the interrupt prior to the data being in memory. The processor may issue a read request for the address of the data and then stall until all of the data arrives at the address. This reduces the processor efficiency, as the processor essentially becomes idle while waiting on the data.

In one approach, a 'false' or 'dummy' PCI read is issued to the device when the interrupt is received at the microprocessor. When the PCI device receives the read request, it transfers its data to the system memory. When that transfer is complete, the processor is assured of having all of the necessary data in the system memory. While this may alleviate some of the problem, there is still a stall that occurs during the processing of the dummy read cycle.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
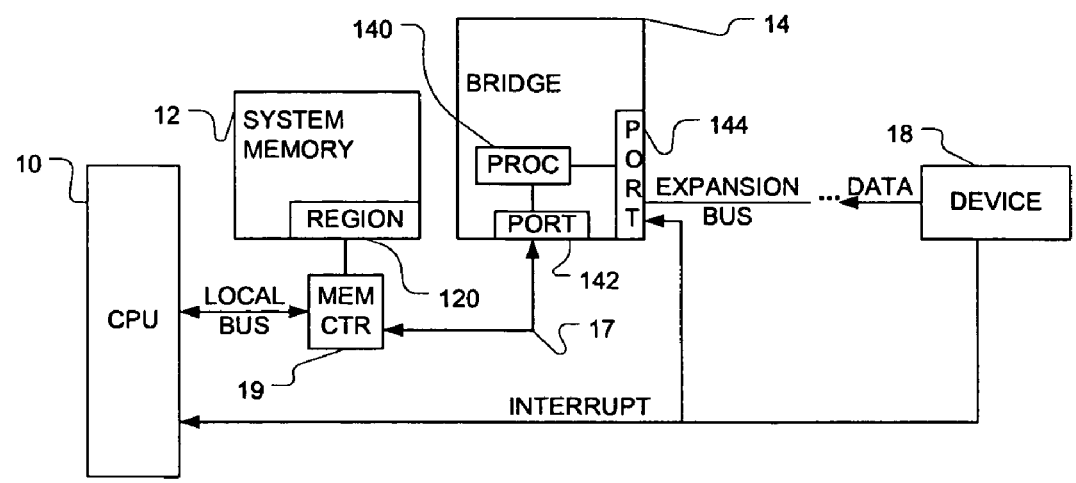
FIG. 1 shows an embodiment of a system having an expansion bus.

FIG. 1 shows an embodiment of a system having an expansion bus. The central processing unit 10, or system processor, is connected to a system memory 12, and a bridge device 14 on a local bus. As will be discussed in more detail further, the memory 12 may have a predetermined area reserved for writes from the bridge 14. A memory controller 19 resides at the junction of the local bus and the output of the bridge 14.

One or more expansion busses have devices such as 18 residing on them. As will be discussed further in more detail, there may be several expansion busses and the bridges may bridge between the expansion bus and the local system bus, or the bridges may bridge between two or more expansion busses. There can be several buffers along the path taken by data from the expansion device and the system processor.

The bridges generally operate in a first-in-first-out procedure (FIFO) and may have several devices transmitting data to the system processor. Several devices may have data routing through the bridge, so the devices 'compete' for slots in the processing, or transaction, queue of the processor in the bridge. While waiting to be processed, the data may be stored in a buffer in that bridge. This causes delays in the data path that may result in inefficiencies in system operation.

For example, the device 18 may transmit the data to the system processor along the expansion bus. When the device has released the data, it transmits an interrupt along a different path, referred to here as a command path. The command path is faster than the data path, and the system processor may receive the interrupt before the data is in the system memory. The processor responds to the interrupt as soon as it receives it, but the data may not be in system memory. It has to wait for the data until it is sure that all data is in system memory. While doing so it stalls, meaning that it does no further processing while it waits for the data.

An analogy would be a road passing by two checkpoints with checkpoints in between. When a certain car passes the first checkpoint being the bridge, a light or electrical signal is transmitted to the checkpoint at the other end of the road stating that the car has passed. The end checkpoint receives the signal almost immediately. Meanwhile, the car has to stop and be checked at the checkpoints in between, so the end point that received the signal has to wait for the car or cars to reach it. The receiving checkpoint does not know how many cars it is expecting, so it just waits until there are no more.

Current approaches have attempted to address this problem. In one approach, upon receipt of an interrupt at the CPU a 'dummy' read transaction is generated by the CPU back to the expansion device that is transmitting the interrupt. When the response to the dummy read returns to the CPU, the CPU can conclude that all the data previously transmitted has arrived. The response to the read request will travel in the data path, and therefore will follow the last portion of the data that was previously transmitted and the transmission of which was what cause the interrupt.

Returning to the analogy above, this would be similar to receiving the signal that the last car has passed the checkpoint and then sending a following car from the receiving checkpoint to the other end and waiting until the following car has returned, thereby verifying that all the original cars have passed by. In this instance, the route traveled includes the bridge checkpoints, such as bridge 14.

The bridge device 14 has a first port 144 that communicates with the expansion bus. A second port 142 communicates with another bus, which may be a system bus or another expansion bus. The bridge processor 140 manages the communications between the two busses. Memory controller 19 resides at the junction of local bus and the bridge output. Memory is attached to the memory controller, which also connects to the local bus and the expansion bus.

Figure 2:
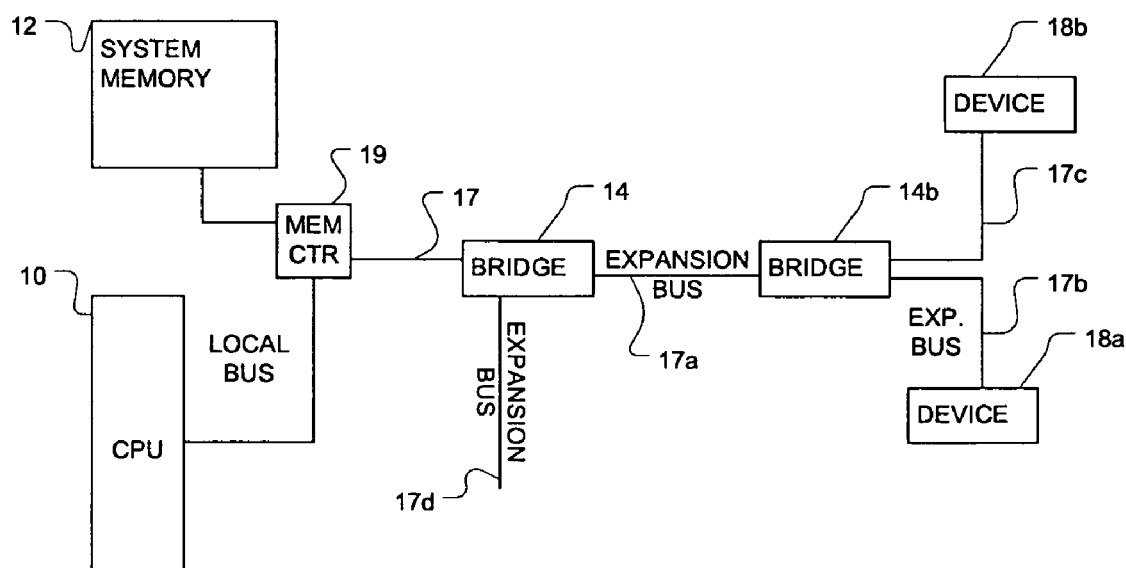
FIG. 2 shows an alternative embodiment of a system having multiple expansion busses.

An alternative arrangement of a system having expansion busses is shown in FIG. 2. The components of this arrangement have been simplified for ease of discussion, but would generally be arranged according to their counterparts in FIG. 1. The CPU 10 is connected through a system bus 17 to a first bridge 14. A first expansion bus 17*a* then connects the first bridge 14 to a second bridge 14*b*. A second expansion bus 17*b* then connects the second bridge 14*b* to the transmitting device 18*a*. Data being transmitted from the transmitting device 18*a* must traverse all three busses and both bridges before reaching the system memory, at which point the CPU could operate upon it. Meanwhile, the interrupt would be transmitted along a command path that is much faster than the data path.

For example, assume device 18*a* is the one transmitting the data, there may be delays as the data travels from 18*a* along the expansion bus 17*b* to bridge 14. The data then has to waits its turn in the queue at 14, before it gets transmitted along the bus 17*a* to the bridge 14. The data then again has to wait as it is processed through the queue at bridge 14 then transmitted to the system memory along bus 17.

Two devices 18*a* and 18*b* may each have an expansion bus, 17*b* and 17*c*. This is done to avoid device 18*a* from interfering with 18*b*, which may occur if the PCI bus is shared. Problems may occur if a pin is bent or similar issue occurs. Device 14 may also have more expansion busses such as 17*d*, with more bridges. This may be done to keep expansion bus lengths short.

Figure 3:
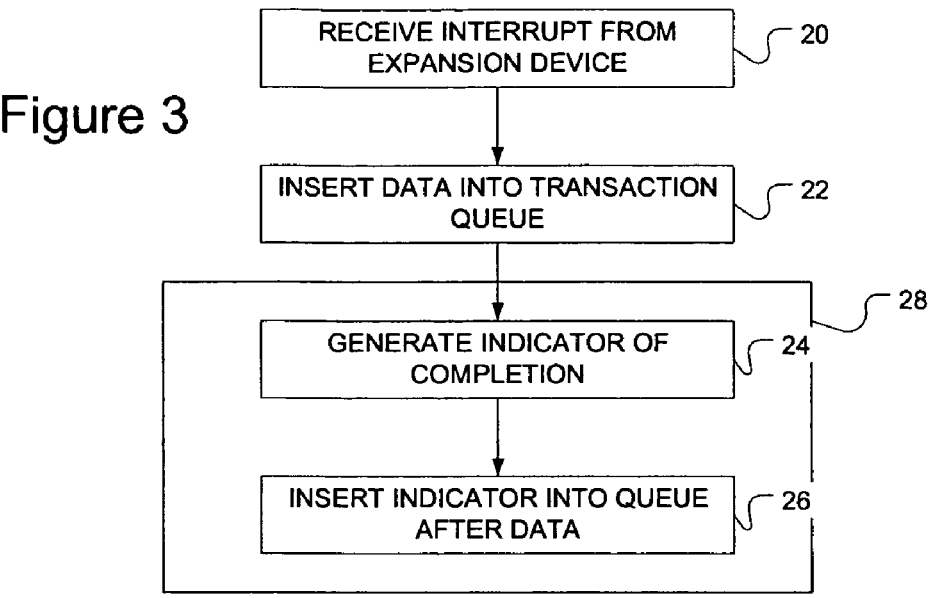
FIG. 3 shows an embodiment of a method to process a transaction received on an expansion bus.

A change to the process can be implemented by embodiments of the invention. As can be seen in FIG. 3, the bridge can be changed to intercept the interrupt from the device 18 as shown in 20 of FIG. 3. When the bridge intercepts the interrupt, it essentially stops it from reaching the processor. As the bridge intercepting the interrupt is the one just next to the transmitting device, the bridge should have the data prior to the interrupt being received at the bridge. The interrupt is transmitted from the device after the data is sent and there are no latencies in the path between the device and the first bridge.

The bridge processes the data transmitted to it as normal, such as inserting it into the transaction queue at 22. The bridge alters its operation at 24 and generates an indicator of completion, where the completion is the completion of the data transmission to the system processor. This indicator is inserted into the queue after the data at 26. This indicator will travel along the data path, rather than the command path.

The effect of the transaction being inserted into the queue on the data path is that it will not reach the system processor or memory until the data transmitted from the expansion device has already been received into system memory. Returning to the previous analogy, when the last car passes the first checkpoint, the first checkpoint sends a vehicle by itself after the last car passes. The receiving checkpoint can go on about its business until the vehicle from the checkpoint arrives.

Figure 4:
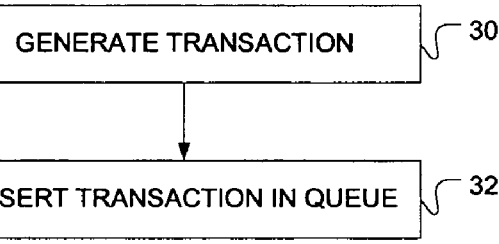
FIG. 4 shows a more detailed embodiment of a method to process a transaction received on an expansion bus.

The transaction inserted into the queue may be addressed to a predetermined region of memory, such as 120 shown in FIG. 1. In a more detailed view of the process 28 of FIG. 3, shown in FIG. 4, the transaction is generated at 30. The transaction is inserted into the transaction queue at 32. Eventually, this transaction will result in a write to the predetermined area of memory.

When the write occurs, the logic in the memory controller generates an interrupt to the processor. The interrupt is then processed according to one of many ways known in the art. However, the processor now 'knows' that the data transmitted from the expansion device is in the memory and can operate on that data as needed. During the period of time between the interrupt being intercepted at the bridge and the write occurring at the system memory, the processor is not stalling, allowing the system to avoid the inefficiencies of a processor stall.

Figure 5:
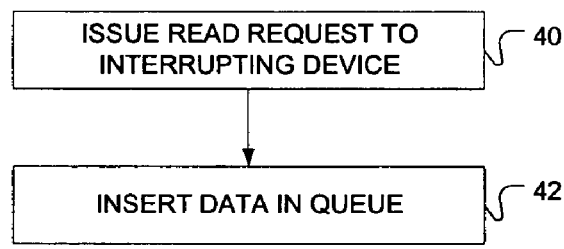
FIG. 5 shows an alternative, more detailed embodiment of a method to process a transaction on an expansion bus.

In an alternative approach, the process 28 of FIG. 3 may be altered slightly as shown in FIG. 5. Instead of the bridge generating a new transaction and inserting it into the queue, the bridge could issue a read request to an address on the expansion device at 40. The bridge would process the response to the read request from the expansion device at 42 after the transmitted data had already been processed, resulting in the same basic effect as the previous alternative. The memory controller logic may have to interrupt the processor with the memory location is updated.

Generally, bridge devices are application specific integrated circuits (ASICs) that are manufactured specifically to act as bridges. In some cases, however, the bridges may be deployed as Field-Programmable Gate Arrays (FPGAs), general-purpose processors, or digital signal processors. In any of these implementations, it is possible that embodiments of the invention may take the form of an article of machine-readable code, where the machine is the bridge device. The code may be loaded into the bridge device, thereby upgrading the instructions to be executed by the bridge device. The instructions, when executed, cause the machine to perform the methods of the invention.

However implemented, the embodiments of the invention allow the processor to continue to perform tasks without stalling to process reads of data that has not yet arrived into memory. This increases the efficiency of the system, as well as allowing more certainty as to the completeness of data being transmitted. The transaction that is inserted after the data not only ensures that the processor will pause to read data already present, rather than data not yet arrived, but that the data received is complete. Complete as used here means that any data that is expected has arrived, since the transaction would arrive after any data transmitted.

Thus, although there has been described to this point a particular embodiment for a method and apparatus for processing a transaction from an expansion device, it is not intended that such specific references be considered as limitations upon the scope of this invention except in-so-far as set forth in the following claims.

What is claimed is:

1. A bridge device, comprising:
   a first port to allow the bridge device to communicate with other devices on an expansion bus;
   a second port to allow the bridge device to communicate with devices on a system bus;
   a memory to store data; and
   a processor to:
   receive a set of data from an expansion device on the expansion bus in a data path;
   receive an interrupt signal intended for a system processor from the expansion device on the expansion bus in a command path and to prevent the interrupt signal from reaching the system processor in the command path;

transmit the set of data into a transaction queue in a data path to the system processor;

generate an indicator of completion to the system processor to indicate the completion of the data transmission to the system processor; and insert the indicator into the transaction queue in the data path to a system memory associated with the system processor after the set of data;

generate a read request to the expansion device.

2. The bridge device of claim 1, the bridge device further comprising a peripheral component interconnect bridge.

3. The bridge device of claim 1, wherein the second port allows the bridge device to communicate with devices on an expansion bus.

4. The bridge device of claim 1, the processor to generate an indicator of completion further comprising the processor to generate a transaction addressed to a predetermined area of a system memory.

5. The bridge device of claim 1, the processor to insert the indicator further comprising the processor to transmit data from the read request to a predetermined address in a system memory.

6. A method, comprising:

receiving a set of data from an expansion device on an expansion bus in a data path;

receiving an interrupt signal intended for a system processor from the expansion device on an expansion bus in a command path indicating a data transfer is complete and preventing the interrupt signal from reaching a system processor;

inserting the set of data from the data transfer into a transaction queue of the data path to the system processor;

generating an indicator of completion to the system processor to indicate the completion of the data transmission to the system processor; and inserting the indicator into the transaction queue of the data path to a system memory associated with the system processor after the set of data;

generating a read request to the expansion device.

7. The method of claim 6, generating an indicator of completion further comprising generating a transaction addressed to a predetermined area of a system memory.

8. The method of claim 7, inserting the indicator further comprising inserting the transaction into the transaction queue.

9. The method of claim 6, inserting the indicator into the transaction queue further comprising inserting data from the read request into the transaction queue, addressed to a predetermined area of a system memory.

10. The method of claim 6, the method further comprising:

receiving data from network device;

receiving the indicator at a predetermined area of memory;

generating an interrupt to a system processor in response to the indicator; and processing the data from the network device.

11. A bridge device, comprising:

a means for allowing the bridge device to communicate with other devices on a first bus, the first bus being an expansion bus;

a means for allowing the bridge device to communicate with devices on a second bus the second bus being a system bus;

a means for storing data; and a means for:

receiving a set of data from an expansion device on the expansion bus in a data path;

intercepting an interrupt signal intended for a system processor from the expansion device on the expansion bus in a command path and preventing the interrupt signal from progressing to the system processor;

inserting the set of data into a transaction queue in data path to the system processor;

generating an indicator of completion to the system processor to indicate the completion of the data transmission to the system processor; and inserting the indicator into the transaction queue in the data path to a system memory associated with the system processor after the set of data;

generating a read request to the expansion device.

12. The bridge device of claim 11, the bridge device further comprising a peripheral component interconnect bridge.

13. The bridge device of claim 11, the means for allowing the bridge device to communicate with device on a second bus further comprising a means to allow the bridge device to communicate on a second expansion bus.

14. An article of computer-readable media containing instructions that, when executed, cause the computer to:

receive an interrupt signal intended for a system processor from an expansion device on an expansion bus in a command path indicating a data transfer is complete and to prevent the interrupt signal from reaching a system processor;

insert a set of data from the data transfer received on a data path into a transaction queue in the data path;

generate an indicator of completion to the system processor to indicate the completion of the data transmission to the system processor; and insert the indicator into the transaction queue in the data path to a system memory associated with the system processor after the set of data; and generate a read request to the expansion device.

15. The article of claim 14, the instructions causing the computer to generate an indicator of completion further cause the computer to generate a transaction addressed to a predetermined area of a system memory.

16. The article of claim 15, the instructions causing the computer to insert the indicator further causing the computer to insert the transaction into the transaction queue.

17. The article of claim 14, the instructions causing the computer to insert the indicator into the transaction queue further causing the computer to insert data from the read request into the transaction queue, addressed to a predetermined area of a system memory.

* * * * *